United States Patent
LeVieux et al.

(12) 
(10) Patent No.: US 6,560,197 B1
(45) Date of Patent: May 6, 2003

(54) DISTRIBUTED XDSL MODEM POOL WITH FRONT-END IDLE MODE PROCESSING

(75) Inventors: John Crawford LeVieux, Carlsbad, CA (US); John Jay Kaufman, Encinitas, CA (US); Rashad Barghouti, San Diego, CA (US); Farokh Parchekani, Northboro, MA (US); Bruce L. Trumbo, San Diego, CA (US); Arndt Joseph Mueller, San Diego, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/342,888

(22) Filed: Jun. 29, 1999

(51) Int. Cl.$^7$ .............................................. G01R 31/08
(52) U.S. Cl. ...................................... 370/231; 370/236
(58) Field of Search ................................ 370/231, 236, 370/468; 375/222, 219, 242

(56) References Cited

U.S. PATENT DOCUMENTS

| | | | | |
|---|---|---|---|---|
| 5,438,614 A | * | 8/1995 | Rozman et al. | 379/93.08 |
| 5,668,857 A | | 9/1997 | McHale | 379/93.07 |
| 5,781,617 A | | 7/1998 | McHale et al. | 379/93.14 |
| 5,898,761 A | | 4/1999 | McHale et al. | 379/93.01 |
| 5,905,781 A | | 5/1999 | McHale et al. | 379/93.14 |
| 5,995,540 A | * | 11/1999 | Draganic | 370/287 |
| 6,052,411 A | | 4/2000 | Mueller et al. | 375/222 |
| 6,263,016 B1 | * | 7/2001 | Bellenger et al. | 370/231 |
| 6,320,867 B1 | * | 11/2001 | Bellenger et al. | 370/420 |

OTHER PUBLICATIONS

"A Modem Operating At Data Signalling Rates Of Up To 33600 bit/s For Use On The General Switched Telephone Network And On Leased Point–To–Point 2–Wire Telephone–Type Circuit", ITU–T V.34, Feb. 1998, pp. i–72.

Richard Williams, "A Digital Modem And Analogue Modem Pair For Use On The Public Switched Telephone Network (PSTN) At Data Signalling Rates Of Up To 56000 Bit/s Downstream And Up To 336000 Bit/s Upstream", V.90, May 6, 1998, pp. 1–50.

* cited by examiner

*Primary Examiner*—Wellington Chin
*Assistant Examiner*—William Schultz
(74) *Attorney, Agent, or Firm*—McDonnell Boehnen Hulbert & Berghoff

(57) ABSTRACT

A system and method for managing resources in a distributed xDSL modem pool arrangement including a first number of front-end modules and a second number of back-end modules. In a preferred embodiment, when a back-end module identifies that its associated call session has entered idle-mode, idle-mode processing is performed in a manner which reduces processing load and electrical power consumption but does not result in a loss of synchronization or require retraining. A repetitively transmitted single modulated symbol transmitted from a user terminal device coupled to the modem pool indicates idle periods in user data. In the preferred embodiment, the modulated symbol to be transmitted is selected such that its spectral properties match those of user data modulated symbols.

20 Claims, 2 Drawing Sheets

DISTRIBUTED XDSL MODEM POOL WITH FRONT-END IDLE MODE PROCESSING

CROSS-REFERENCE TO RELATED APPLICATIONS

This application is related to U.S. patent application Ser. No. 09/056,166, filed Apr. 6, 1998 (Mueller, et al.) entitled "Idle Mode for Digital Subscriber Line"; U.S. patent application Ser. No. 09/164,879 filed Oct. 1, 1998 (Sullivan, et al.) entitled "System and Method for Providing High-Speed Data Access Using a Distributed Modem"; co-pending U.S. Patent Application Appl. Nos. entitled "Distributed Voice-Band Modem Pool with Front-End Idle Mode Processing", filed contemporaneously herewith; and co-pending U.S. Patent Application Appl. Nos. entitled "Distributed Speech Coder Pool System with Front-End Idle mode Processing for Voice-Over-IP Communications", also filed contemporaneously herewith.

TECHNICAL FIELD

This invention relates to distributed modem pooling techniques for maximizing resource utilization in an xDSL communication network, and more particularly, for maximizing resource utilization of the network when call sessions are idle.

BACKGROUND

Modem concentration facilities, such as a telephone company's Central Office (CO), serve as communication links between subscriber lines and a digital network such as the Public Switched Telephone Network (PSTN). Modems provide part of the interface between subscriber lines and a digital network such as the PSTN. In its simplest form, a modem is a device that adapts a digital signal to a telephone line. It converts a desktop computer's digital data, for example, into audio-frequency analog signals to be transmitted over a telephone channel, and then back to digital form at the opposite receiving end. Modems also include functionality to dial the line, answer a call, and control transmission speed. During data exchange along a subscriber link, new modems have built-in error correction, automatic feature negotiation, and other similar techniques to ensure proper transmission and reception of data.

Increased communication of digital data across subscriber links has led to a proportionate investment by phone companies into new and existing infrastructures to meet the bandwidth requirements needed to handle the additional traffic. One area in which enormous investment has been required is in linking Internet Service Providers (ISPs) with their clients (Internet users) across the PSTN backbone. The required investment in this area has been increased as a result of industry practices that partially relieve the ISPs from the full cost of PSTN connections. Because the ISPs do not therefore pass the full cost of these connection times on to their clients, i.e., they bill them at flat rates, the clients engage in practices that waste the limited resources of the network. One of these practices involves a client establishing a connection with an ISP and maintaining it indefinitely even during long periods of inactivity, consequently, tying up a network resource unnecessarily. Such long idle periods of time are common place in today's data communication networks. Also, another type of idle exists as a result of the bursty nature of Internet traffic in which shorter idle periods of time are sandwiched between successive transmission bursts.

Because most Internet users communicate with their host ISPs over analog subscriber lines across a digital circuit-switched network, such as the PSTN, the congestion problem is most severe in those networks. The least cost-effective and most inefficient way of adding resources to handle this congestion is to increase the number of modems (in the form of modem pools) available for call sessions. When active data traffic becomes low, a significant number of these modems in the pool will remain mostly idle and underutilized resulting in a waste of network resources.

One approach to overcoming this problem is to detect the link's idle state and, consequently, terminate the call and make its resources available to other network users. However, reestablishing the communication link when the user desires to reactivate the call session is a complicated process which results in a lengthy delay and could prove to be impossible if all resources are presently tied up in the network. Generally, establishing an xDSL modem link over a digital circuit-switched channel is very time consuming. For example, connecting an ADSL call at the physical layer may take 15 to 20 seconds. Incurring such a delay for every data communication restart is clearly impractical.

The inventors have determined that what is needed are ways to better manage network resources such that processing capabilities of modems associated with idle call sessions are better utilized without disruption of their underlying physical layer link. The present invention provides efficient alternative solutions.

SUMMARY

The invention provides a system and method for managing resources in a distributed xDSL modem pool arrangement including a first number of front-end modules and a second number of back-end modules. In the preferred embodiment, when a back-end module identifies that its associated call session has entered idle-mode, idle-mode processing is performed in a manner which reduces processing load and electrical power consumption but does not result in a loss of synchronization or require retraining.

The invention relies on the generation of a repetitively transmitted single modulated symbol generated by an end user device during idle periods in user data. In the preferred embodiment, the modulated symbol to be transmitted is selected such that its spectral properties match those of user data modulated symbols. For an ADSL system, and the like xDSL variants thereof, a preferred idle symbol is the 'superframe' synchronization symbol. A separate modulated symbol would indicate the end of the idle state. In accordance with the present invention, the processing of idle symbols is entirely (or substantially) handled by the front-end module thus freeing up the associated back-end module which may be reassigned to another call session at that point; or to the extent the front-end to back-end link is maintained, the back-end processing demands are reduced which may allow the back-end module to provide service to another call session. In the case where the back-end is reassigned, full control of idle symbol processing may be handled by the low-cost front-end module. When active data appears on the subscriber link, the xDSL call session link may again be established bringing any of the available high-capability back-end modules on line.

In accordance with a preferred embodiment, the front-end modules are physically separate low cost devices provided with only such processing power, including memory and programmed functionality, necessary to perform reduced complexity time-domain processing in idle-mode where each front-end module requires negligible processing resources to detect and process idle symbols being transmitted from the user device. Very little power is required by the front end module during idle-mode thus resulting in improved power consumption being realized without tearing down the call session physical layer link. As for the associated back-end module, this modem resource may be powered down altogether or reassigned to a new non-idle call session.

In another preferred embodiment, the front-end modules are provided with sufficient processing power, including memory and programmed functionality, to maintain more than one subscriber link active, at least during idle processing of such links.

In yet another embodiment, the front-end modules and back-end modules are each fully functional xDSL modem devices capable of operating as either front-end devices or back-end devices, respectively, on an as needed basis.

The details of one or more embodiments of the invention are set forth in the accompanying drawings and the description below. Other features, objects, and advantages of the invention will be apparent from the description and drawings, and from the claims.

DETAILED DESCRIPTION

Overview

Figure 1:
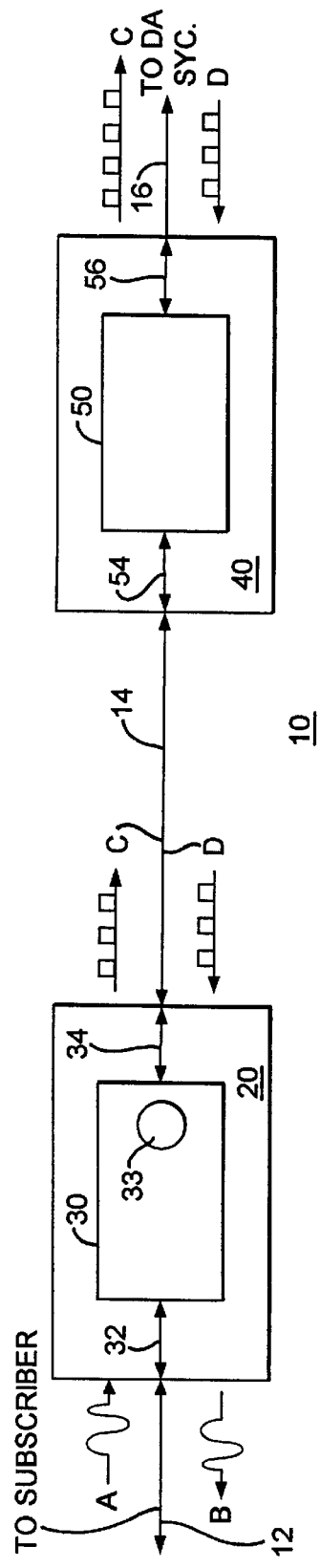
FIG. 1 is a block diagram generally showing a distributed xDSL modem having a front-end module and a back-end module in accordance with the present invention.

The following description is made in the context of using the invention as part of an xDSL communication system. A related application of the invention in a voice-band solution is described in the co-pending US application, titled "Distributed Voice-Band Modem Pool with Front-End Idle Mode Processing", filed contemporaneously herewith. A further related application of the invention in a Voice-Over-IP solution is described in the co-pending US application, titled "Distributed Speech Coder Pool System with Front-End Idle mode Processing for Voice-Over-IP Communications", also filed contemporaneously with the present application. However, it should be generally understood that the invention as disclosed herein may be applied to any xDSL or equivalent communications system in which use of the invention would provide similar benefits.

The invention provides a system and method for freeing up modem resources of call sessions in idle-mode, preferably located at a central location, and making them available for new and existing active call sessions. This generally involves reassigning certain resources associated with a call session upon detection of a transition from active-mode, when user data are being sent or received, to idle-mode, when no user data are being sent or received.

The invention differs from prior art resource management approaches in that the physical layer link is maintained throughout the duration of the call session. To accomplish this, and in accordance with the preferred embodiments, a sufficient number of the idle call session's resources are retained to keep its physical layer link alive while the remaining ones are dynamically reassigned to other active calls. Subsequently, as active data reappear on the link indicating a resumption of active communication, the limited reserved idle call's resources request at that time that additional resources be provided to handle the increased traffic.

A key aspect of the invention is that because the physical layer link to the user terminal device is maintained, the user at that device experiences little or no delay in the transition from idle-mode back to active-mode, and the associated call session never gets, prematurely interrupted for lack of activity. This is generally achieved by generating and repetitively transmitting a single modulated symbol during idle periods, as shall be described below in greater detail. In a preferred embodiment, the modulated symbol to be transmitted is selected such that its spectral properties match those of user data modulated symbols.

Given a limited number of modems available to handle incoming calls and an equal number of active call sessions, a distributed xDSL modem pool solution, as will be described herein below, allows new call sessions to be initiated without in any way detrimentally affecting or tearing down active call sessions which may or may not be presently idle.

Distributed Modem Operation

The invention aims to take advantage of the benefits of a so-called distributed modem pool architecture. A distributed modem pool generally encompasses the notion of distributed modems extended to operate in banks or pools; or other equipment that performs the functions of modems for a plurality of subscriber lines. Distributed modem processing, and distributed modem pools in particular, both in xDSL and non-DSL environments, are described in greater detail in related co-pending U.S. patent application Ser. No. 09/164, 879 filed Oct. 1, 1998 titled "System and Method for Providing High-Speed data Access using a Distributed Modem", which application is incorporated herein by reference.

The basic operation of a distributed xDSL modem 10 generally configured in accordance with the invention is shown in block diagrammatic form in FIG. 1.

Distributed xDSL modem 10 includes a front-end module 20, a back-end module 40, and an interconnection path 14. The distributed modem 10 is "distributed" because the first-end module 20 is physically separate but electrically coupled to the back-end module 40. For example, the front-end module 20 and the back-end module 40 may be on separate circuit boards, or on entirely separate chassis. The front-end module 20 may be separated from the back-end module 40 by distances that may be measured in fractions of an inch, or in miles.

In a typical DSL system, the front-end module 20 would be connected to a DSL subscriber line 12 over which a subscriber link (including a physical layer link) between it and a DSL modem-equipped user terminal device (not shown) is established during a given call session. As is well known, the DSL modem-equipped user terminal device essentially encodes digital data as analog signals at very high rates. The subscriber link is conducted over twisted-pair conductors bundled with a large number of other twisted-pair conductors, each used at different times and for different purposes, all in a known manner.

In accordance with the present invention, the front-end module 20 includes front-end circuitry 30, an analog path 32 and a digital path 34. The front-end circuitry 30 receives an analog signal A at the analog path 32. The front-end circuitry 30 converts the analog signal A to a digital signal C that is output via the digital path 34 to the interconnection path 14 and received by the back-end module 20.

In a distributed xDSL modem 10 as contemplated herein, the front-end circuitry 30 may include an idle processor 33 which, in accordance with a preferred embodiment, is capable of detecting a repetitively transmitted idle symbol generated by the user terminal device during idle periods in the manner described in greater detail below. The purpose of the idle processor 33 is thus to maintain the corresponding call session physical layer link alive as the call session transitions into idle-mode, and until such time as the call session transitions back to active-mode.

In a first preferred embodiment, the front-end module 20 communicates digital signals to the back-end module 40 only when active user data are detected on the subscriber line 12. Active user data include any signal that may be demodulated to yield signals that convey information.

The front-end circuitry 30 is further configured to receive a digital signal D over the interconnection path 14 and the digital path 34. The front-end circuitry 30 converts the digital signal D to an analog signal B and outputs it over the analog path 32 to the DSL subscriber line 12 where it may be received by the user terminal device.

The analog path 32 may include components for processing the analog signal communicated over subscriber line 12 and for initiating and tearing down calls. These functions, which are known to those of ordinary skill in the art, may include without limitation the functions of detecting a ring, pulse dialing, tone dialing, providing overload/overvoltage protection, providing loop supervision, providing a hybrid line, line testing and off-hook relay.

The interconnection path 14 communicates digital signals C and D between the front-end module 20 and the back-end module 40. The digital signal C comprises samples of the user's analog transmission that have been gathered and optionally processed in the front-end module 20. The samples C may represent the direct output of a CODEC or a signal that may have been partially demodulated in the front-module 20 and which will undergo the remaining demodulation operations in the back-end module 40. The digital signal D represents samples that will be processed in the front-end module 20 to become the distributed modem's analog transmission toward the user. These samples at the input of module 20 may be fully ready to be processed by the CODEC to produce the outgoing analog signal or they may still require further processing to complete modulation operations that initiated in the back-end module 40.

The back-end module 40 includes a signal processor 50 for converting the digital signal C to the data stream E and the data stream F to the digital signal D. The signal processor 50 receives the digital signal C from the interconnection path 14 and a digital path 54. The signal processor 50 receives the data stream F from a data system over the data path 56 and sends the data stream E over the data path 56. The data path 56 includes an interface to a terminal data system medium 16.

The signal processor 50 may include a processing engine to modulate/demodulate the data to/from the front-end module 20 and to perform high level functions such as, for example, data compression and error detection and correction. This engine may be comprised of a single processing element, such as a special Digital Signal Processor (DSP) or a general-purpose microprocessor (MP), which performs both the modulation/demodulation functions and the high level data processing functions. Or, the engine may be comprised of both a DSP to perform the modulation/demodulation functions and a MP to do the high-level data processing functions.

The back-end module 40 may include other components along the second digital path 54 and the data path 56 to enhance its operation and add more functionality. For example, the data path 56 may include a serial controller, a bus interface, or any other data system interface for connecting to the terminal data system communications medium 16. The data system communications medium 16 may include without limitation a simple serial interface (e.g., RS-232), or a packet switched network (e.g., Ethernet).

The distributed DSL modem 10 may perform the functions of any DSL modem available today. One advantage of the distributed modem 10 is that the front-end module 20 and the back-end module 40 are physically separated and connected by the interconnection path 14. As has already been explained, the advantage of separating these modules is that they may now be installed in locations having more suitable environments for the type of processing they perform.

For example, the front-end module 20 may be installed in a place that is close to the user's terminal device/modem, such as a Remote Digital Terminal (RDT), a telephone network hub, or a telephone network cabinet, etc. Such an installation may be made with a connection between the user's premises equipment and the front-end module 20. The digital signal processing performed by the back-end module 40 may be located in equipment that is placed in the central office serving the user's local area. The back-end module 40 need not be subjected to the harsh environment found in a remote digital terminal. The front-end module 20 may then be connected to the back-end module 40 using existing high-speed digital lines, such as fiber-optic lines communicating at levels of OC-3, OC-12, etc.

Distributed Modem Pool System

Figure 2:
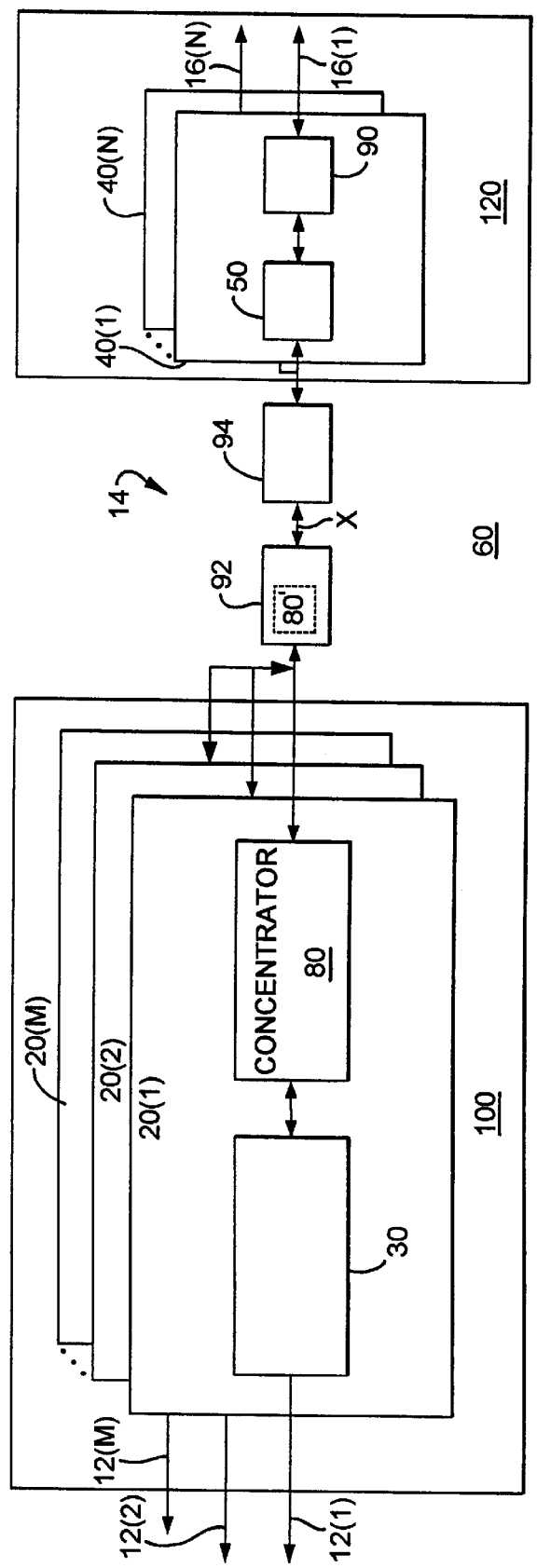
FIG. 2 is a block diagram of a distributed xDSL modem pool including a plurality of plural distributed modems communicably interconnected in accordance with a preferred embodiment of the present invention.

FIG. 2 shows a block diagram of a distributed DSL modem pool system 60. The distributed modem pool system 60 in FIG. 2 includes a first chassis 100 and a second chassis 120 connected by an interconnection path 14. The first chassis 100 includes M front-end modules 20(1)–20(M), each of which is connected to a subscriber line 12(1)–12(M), respectively.

The front-end modules 20(1) et seq. may each include a front-end circuitry 30, and a concentrator 80. The back-end modules 40(1)–40(N) may each include the signal processor 50 and a high-level function processor 90. The signal processor 50 performs the modulation/demodulation functions of the digital signals received from the front-end modules 20(1) et seq. and on the data stream received from the data communications medium 16(1) et seq.

The high-level function processor 90 may perform a variety of high level functions as analog DSL signals typically exist in a noisy time varying environment. Accordingly, DSL modem systems necessarily must include sophisticated equalizer training, echo canceling, and synchronization techniques to cope with these factors.

The front-end modules 20(1) et seq. are connected to the interconnection path 14 via a multiplexing interface 92. The second chassis 120 includes N back-end modules 40(1)–40(N), each of the back-end modules 40(1) et seq. being connected to a data system connection 16(1)–16(N). The second chassis 120 is connected to the interconnection path 14 via a second multiplexing interface 94. The first and second chassis 100, 120 may include any type of enclosure that may be used to house one or more circuit boards or other type modules. The first and second chassis 100, 120 may include equipment for performing other functions such as telephony functions and data communications functions. The first chassis 100 may include for example line racks that are presently used in remote digital terminals and in central office switching systems. The second chassis 120 may include remote access servers, gateways or other equipment for performing data communications.

The interconnection path 14 and the multiplexing interfaces 92 and 94 may include any digital communications medium with sufficient bandwidths to carry the digital signals between the M front-end modules 20(1)–20(M) and the N back-end modules 40(1)–40(N).

The concentrator 80 in each of the front-end modules 20(1) et seq. detects when a user that is connected at the respective subscriber line 12 is actively communicating data. The concentrator 80 enables the communication of data to and from the back-end modules when such data are detected. In accordance with a preferred embodiment, when the user is not actively communicating data, the concentrator 80 does not communicate signals to the back-end modules 40(1) et seq.

The concentrator 80 may include a digital signal processing device to analyze the digital signals for the presence or a repetitively transmitted symbol indicative of an idle period in user data. The DSP used in the concentrator 80 may be a lower performance and lower cost DSP than DSPs used in the back-end modules 40(1) et seq. because concentration does not require the same processing capabilities as full modulation and demodulation. One advantage of using the concentrator 80 is that, when combined with the multiplexing interface 92, the interconnection path 14 carries only data between the first and back-end modules 20 and 40, respectively. The bandwidth of the interconnection path 14 need only accommodate the first and second digital signals that carry data, and not signals that are communicated during idle periods. In an alternative embodiment, a concentrator 80 is used in the first multiplexing interface 92 instead of in the front-end module 20.

The first and second multiplexing interfaces 92 and 94 may be used to manage the communication over the interconnection path 14. In one embodiment, the concentrator 80 in the front-end module 20(1) et seq. creates data packets of samples which may be organized into channels by the first multiplexing interface 92. The channels are communicated as a signal X over the interconnection path 14. The signal X may also communicate channels of data packets created by the signal processor 50 in the back-end modules 40(1) et seq. which may be placed in the channels at the second multiplexing interface 94. The signal X in FIG. 2 may be communicated using a time division multiplex scheme, however, any other data communications scheme, which supports packet data or circuit switched streams may be adopted.

One advantage of communicating the samples as packets is that, at any instant in time, a packet containing samples for a particular user's data traffic could be handled by any one of several back-end modules 40(1) et seq. The signal processors 50 in each of the back-end modules 40(1) et seq. acquire or are provided from the front-end module sufficient historical information about the string of packets from which the samples belong. A given signal processor 50 may then process sample packets of user data from any of the front-end modules 20(1) et seq. in potentially a combination of upstream and downstream packets. This makes it unnecessary to establish a one-to-one correspondence between the front-end and back-end modules 20(1) et seq., 40(1) et seq.

In another embodiment, the signal X is communicated over the interconnection path 14 using a circuit. The multiplexing interfaces 92 and 94 provide circuit connections between front-end modules 20(1) et seq. and back-end modules 40(1) et seq. Multiple circuits may be simultaneously supported using time division multiplexing or any other communication scheme suitable for supporting multiple simultaneous circuits.

In an alternative embodiment, the front-end module 20(1) et seq. communicates bursts of bit streams to and from a designated one of the back-end modules 40(1) et seq. The first and second multiplexing interfaces 92,94 may include module addressing schemes for designating target modules for any given burst of a bit stream. In other embodiments, the data may be communicated in packets to a designated back-end module 40(1) et seq.

Idle Symbol Generation

One very practical and quite useful approach to detecting an idle state in a xDSL communication system which finds suitability in a distributed xDSL modem pool system architecture, as proposed herein, was first described in related co-pending U.S. patent application Ser. No. 09/056,166, filed Apr. 8, 1998 (Mueller, et al.) entitled "Idle Mode for Digital Subscriber Line" which application has been incorporated herein by reference.

The present invention aims to expand the application of a user-device generated repetitive idle symbol(s) to bring to pass the benefits of distributed modem pool concept to an xDSL distributed modem architecture such as the exemplary distributed modem pool system 60 of FIG. 2. The key aspect is that upon detection of an idle-mode condition, the back-end module 40 assigned to handle a call, together with the communicating front-end module 20, communicably cooperate to free up the back-end module 40.

In a preferred embodiment, the front-end circuitry 30 in the front-end module includes sufficient processing power to detect the idle symbol generated by the idle terminal user device keeping the link alive as the back-end module 40 relinquishes control of the "always connected" (but presently idle) call session. Once control is relinquished to the front-end module 20, the back-end module 40 may be re-assigned or switched to another mode to preserve power.

Figure 3:
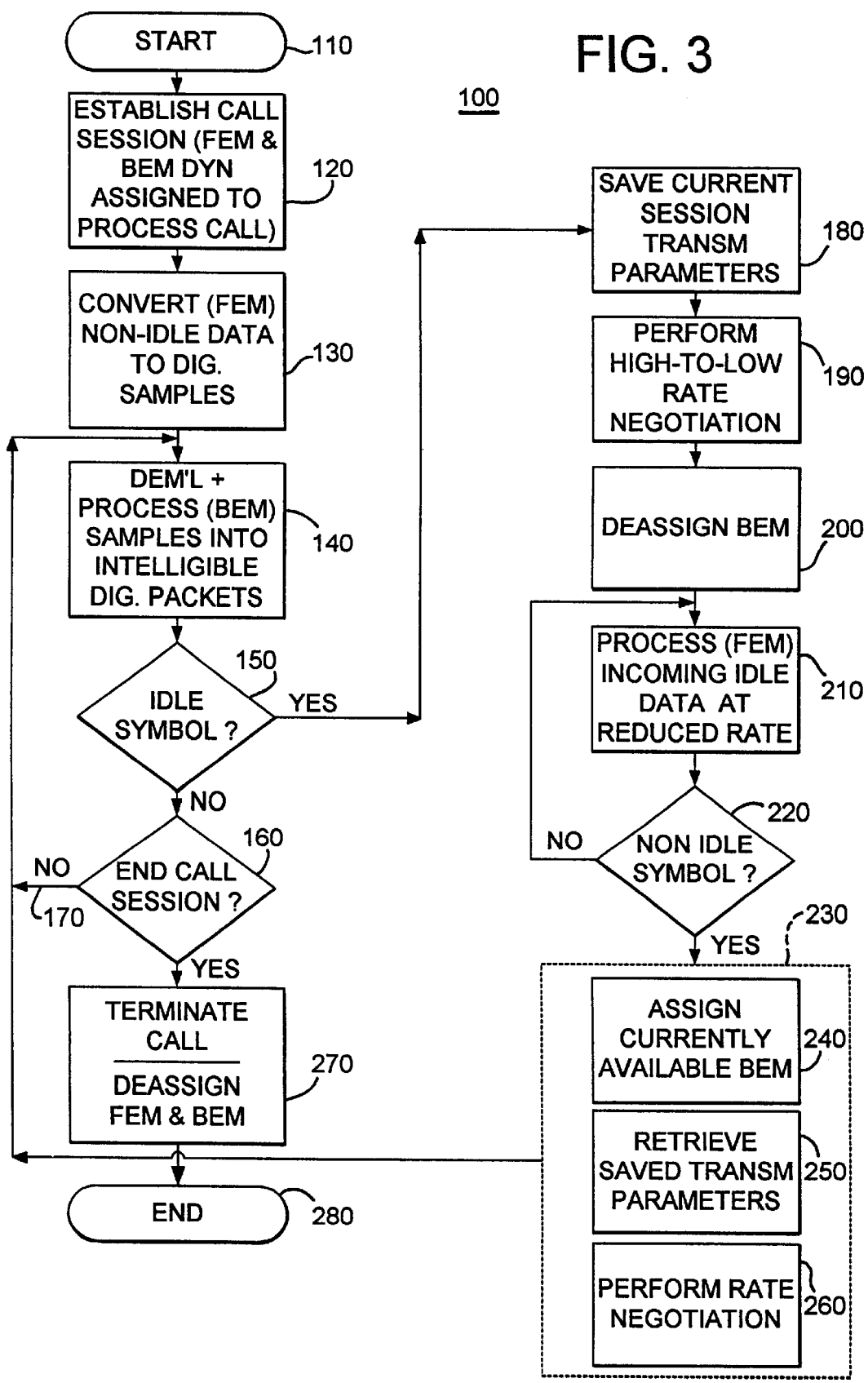
FIG. 3 shows the operational flow for performing idle-mode processing in response to a detection of idle in accordance with a preferred embodiment.

FIG. 3 shows an operational flow diagram 100 for performing idle symbol detection in a distributed modem pool type central modem facility in accordance with a preferred embodiment.

At step 120, a call session is initiated over the subscriber link connecting a terminal end user to the central modem facility, as generally described above. The central modem facility includes a plurality of modules including front-end modules 20(I)–20(N) and back-end modules 40(I)–(N). Call initiation involves assigning a front-end module 20 and a back-end module 40 to establish the current call session.

It is contemplated that such resource management may be performed dynamically using predefined statistical multiplexing techniques. A dedicated central processing unit external to the modules may be employed to assign and deassign resources. In an alternate solution, resource management is performed by the modules themselves and preferably by the communicably coupled DSPs in the respective modules.

The front-end module 20 assigned to the current call session processes the incoming non-idle data and then sends them over link 14 to the assigned back-end module 40 (step 130). The back-end module 40 demodulates, formats and converts the digital samples into intelligible packets (step 140).

Before (or as part of) the cal session setup, session characteristics associated with the user terminal device and the corresponding subscriber link are first saved (step 180) to allow for rapid re-establishing of the call session upon detection of active-mode data during the idle period by the front-end module 20. Such session characteristics may include equalization, echo cancellation, gain control, data rate, symbol rate, pre-emphasis, pre-coding, encoding, mapping, and error control parameters.

In accordance with a preferred embodiment, the back-end module 40 may them be put back in the "available" list of modems in the modem pools, and thus is de-assigned from the call session (200). Such deassignment may be on a temporary or permanent basis, based on system designer options. Of course, it is also possible to maintain the assignment of the back-end module 20 to the current call session but configured to also simultaneously process other incoming calls on an as needed basis.

Upon the relinquishing of idle symbol processing by the module 40, control of idle data processing is exclusively turned over to the front-end module 20, and more specifically, to the associated front-end circuitry 30 (step 210). The front-end module 20 then monitors the incoming data for a non-idle symbol all the while keeping the physical layer link alive with the user terminal device (step 210).

Upon detection of a non-idle symbol (i.e., switch to active-mode), action is taken by the front-end module 20 to have additional resources provided to handle the full rate of incoming active data (step 230). Such action may involve the assignment of a back-end module 40 (step 240), retrieval of saved session characteristics (step 250), and establishment of communications between the front-end module 20 and newly assigned back-end module 40 at the initial call setup throughput rate (step 260) in a seamlessly quick manner using the saved session characteristics.

Once back in active-mode processing, each digitized sample is passed from the front-end module 20 to the new back-end module 40 in the same manner as prior to the idle-mode condition. It should be appreciated that resources may be assigned and de-assigned indefinitely while the link is kept alive at the user terminal device or until such time as a timeout condition is reached. When the call session is terminated for whatever reason, all resources (modules 20, 40) are de-assigned and placed back in the pool of available modems (step 280, 290).

Thus, in the preferred embodiment just described, when a front-end module identifies that its associated call session has entered idle-mode, the associated back-end module relinquishes control throughout the duration of the call session. Because the processing of the idle data are now handled by the front-end module, the back-end module may be reassigned to another call session at that point; or to the extent the front-end to back-end link is maintained, the back-end processing demands are reduced which may allow the back-end module to provide service to another call session.

In the case where the back-end is reassigned, full processing of the reduced rate link may be handled by the low-cost front-end module. When active data appears on the subscriber link, appropriate action is taken to bring another available high-speed back-end modules online.

Since current DSL standards do not include separate signaling for idle condition, this latter implementation would require re-configuring user terminal devices to generate distinctive idle symbols. As has been explained above, the use of a single modulated symbol differs from prior art transmission of a constant digital data stream which is encoded into a time-varying set of modulated symbols. In the preferred embodiment, the modulated symbol to be transmitted is selected such that the spectral properties match those of user data modulated symbols. Accordingly, the use of specially generated idle symbols as proposed in the commonly-assigned co-pending patent application by Mueller patent application allows repetitive use of a stored idle symbol having spectral characteristics that are the same as data. Each front-end module 20 need only compare each received symbol in the time domain for identity to determine that an idle symbol has been received, thus reducing computational requirements. For an ADSL system, and variants thereof, a preferred idle symbol is the "superframe" synchronization symbol.

A separate modulated symbol would indicate the end of idle state. In one preferred implementation according to Mueller, et al., the exit symbol (indicative of end of idle state) is the idle symbol shifted by a 180 degree phase shift. Such an exit symbol is sent by the user terminal device to the front-end module 20 upon determining that data are to be sent or received again. The front-end module 20 in response to such an exit symbol assumes the next symbol is the first symbol of the first superframe following the idle period interruption. The latency of this approach is one modulated symbol, and thus has no effect on the data latency and imposes no additional buffering requirements. The front-end module circuitry 30 provides idle state modulated symbol detection and phase detection. Symbol detection can be performed in the time-domain for faster and easier detection, requiring little processing power. Upon detection of a 180 degree phase shift of the idle symbol, the front-end module would assume idle-mode is ended and would then take appropriate action to bring either the same or another available high-speed back-end module online to process the incoming non-idle data.

It should be appreciated that once a back-end module 40 relinquishes control to the associated front-end module 20, as should occur in an idle-mode situation, the front-end module 20 need only completely decode and verify the first idle symbol. For all subsequent symbols, a time domain correlation can be performed at the analog-to-digital symbol level with the previous symbol. This time domain correlation is preferably performed at a reduced sampling rate, thus requiring less electrical power.

In accordance with a preferred embodiment, the front-end modules are physically separate low cost devices provided with only such processing power, memory and programmed functionality necessary to convert received analog data signals to digital samples for processing by a digital signal processor in one of plural back-end modules which may be logically coupled thereto during a given call session.

In another preferred embodiment, the front-end modules are provided with sufficient processing power, memory and programmed functionality to maintain more than one subscriber link active, at least during idle processing of such links.

In yet another embodiment, the front-end modules and back-end modules are each fully functional DSL modem devices capable of operating as other front-end devices or back-end devices, on an as needed basis.

Implementation

The invention may be implemented in hardware or software, or a combination of both (e.g., programmable logic arrays). Unless otherwise specified, the algorithms included as part of the invention are not inherently related to any particular computer or other apparatus. In particular, various general purpose machines may be used with programs written in accordance with the teachings herein, or it may be more convenient to construct more specialized apparatus to perform the required method steps. However, preferably, the invention is implemented in one or more computer programs executing on programmable systems each comprising at least one processor, at least one data storage system (including volatile and non-volatile memory and/or storage elements), at least one input device, and at least one output device. The program code is executed on the processors to perform the functions described herein.

Each such program may be implemented in any desired computer language (including machine, assembly, or high level procedural, logical, or object oriented programming languages) to communicate with a computer system. In any case, the language may be a compiled or interpreted language.

Each such computer program is preferably stored on a storage media or device (e.g., ROM, CD-ROM, or magnetic or optical media) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of embodiments of the present invention have been described. Nevertheless, it will be understood that various modifications may be made without departing from the spirit and scope of the invention. Accordingly, other embodiments are within the scope of the following claims.

What is claimed is:

1. In a distributed digital subscriber line (xDSL) modem pool system including a plurality of front-end modules and a plurality of back-end modules capable of contemporaneously servicing a plurality of call sessions, a method of maintaining the physical layer link of a DSL call session for duration of the call session, each call session being serviced by both a front-end module and a back-end module dynamically assigned thereto at call setup and having an initial data throughput rate, the method comprising:

(a) in a front-end module servicing a call session presently in active-mode, generating digital samples representative of DSL frame data transmitted by a user terminal device over the corresponding call session physical layer link;

(b) in a back-end module servicing the call session which is presently in active-mode, processing the digital samples as a function of the initial data throughput rate;

(c) in the front-end module, detecting an idle-mode modulated symbol indicative of idle-mode; and (d) relinquishing control of the call session to the front-end module by the back-end module during idle-mode.

2. The method of claim 1, further comprising the step of:

(a) while in idle-mode, detecting by the front-end module an exit symbol transmitted by the user terminal device.

3. The method of claim 2, further comprising the step of:

(a) reassigning the back-end module to a different call session in response to the relinquishing control step.

4. The method of claim 2, wherein upon entering idle-mode, the front end module transitions to a decreased data throughput rate.

5. The method of claim 1, further comprising the step of:

(a) reassigning the back-end module to a different call session in response to the relinquishing control step.

6. The method of claim 1, wherein upon entering idle-mode, the front end module transitions to a decreased data throughput rate.

7. The method of claim 6, further comprising the steps of:

(a) while in idle-mode, detecting by the front-end module an exit symbol transmitted by the user terminal device indicative of a call session transition back to active-mode;

(b) assigning a back-end module and initiating an active call session communication; and (c) transitioning, by the front end module, to an increased data throughput rate, in response to the step of detecting the exit symbol.

8. The method of claim 7, wherein the step of relinquishing control includes the step of saving session characteristics associated with the user terminal device and the corresponding subscriber link.

9. The method of claim 8, wherein the step of initiating an active session communication involves dynamically assigning a different back-end module to the call session, such different back-end module processing the digital samples from the front-end module after the transition from idle-mode back to active-mode.

10. The method of claim 9, wherein the step of saving session characteristics associated with the user terminal device and the corresponding subscriber link includes saving at least one member of the transmission group comprising equalization, echo cancellation, gain control, baud rate, symbol rate, pre-emphasis, pre-coding, encoding, mapping, and error control.

11. A distributed xDSL modem pool system for maintaining the physical layer link of plural call sessions, each call session being serviced by both a front-end module and a back-end module dynamically assigned thereto at call setup, the system comprising:

(a) a first number of front-end modules, each front-end module having:

(b) front-end circuitry, including an idle processor, for maintaining the corresponding call session physical layer link when the call session is in idle-mode; and (c) an analog-to-digital converter generating digital samples representative of DSL frame data transmitted by a user terminal device over such call session physical layer link when the call session is in active-mode; and (d) a second number of back-end modules, each coupled to and physically separate from the first number of modules, each back-end module including a digital signal processor for processing when the associated call session is in active-mode the digital samples from the front-end module assigned thereto at call setup and for processing digital samples from another front-end module when the associated call session is in idle-mode.

12. The system of claim 11, wherein the front-end circuitry includes means for detecting when the call session physical layer link enters idle-mode.

13. The system of claim 12, wherein the front-end circuitry includes means for detecting active data on the physical layer link while in idle-mode.

14. The system of claim 13, wherein the system includes means for dynamically assigning a new back-end module to the current call session in response to detection of active data.

15. The system of claim 11, wherein the front-end circuitry includes means for detecting active data on the physical layer link while in idle-mode.

16. The system of claim 15, wherein the system includes means for dynamically assigning a new back-end module to the current call session in response to detection of active data.

17. The system of claim 11, wherein the front-end circuitry includes means for detecting a transition to idle-mode in response to receiving a first distinctive command from the user terminal device.

18. The system of claim 17, wherein the front-end circuitry further includes means for detecting a transition to active-mode in response to receiving a second distinctive command from the user terminal device.

19. The system of claim 18, wherein the system includes means for dynamically assigning a new back-end module to the current call session in response to detection of the second distinctive signal.

20. The system of claim 18, wherein the system includes means for dynamically reassigning the back-end module to the current call session in response to detection of the second distinctive signal.

* * * * *